United States Patent
Seo et al.

(10) Patent No.: US 9,753,133 B2
(45) Date of Patent: Sep. 5, 2017

(54) APPARATUS AND METHOD FOR CONVERTING MULTI-CHANNEL TRACKING INFORMATION FOR INTEGRATED PROCESSING OF FLIGHT DATA

(71) Applicant: AGENCY FOR DEFENSE DEVELOPMENT, Daejeon (KR)

(72) Inventors: Dongsoo Seo, Taean-gun (KR);
Jeongbu Baek, Taean-gun (KR);
Yongjae Lee, Seosan-si (KR)

(73) Assignee: AGENCY FOR DEFENSE DEVELOPMENT, Daejeon (KR)

(*) Notice: Subject to any disclaimer, the term of this patent is extended or adjusted under 35 U.S.C. 154(b) by 376 days.

(21) Appl. No.: 14/550,690

(22) Filed: Nov. 21, 2014

(65) Prior Publication Data

US 2016/0178743 A1 Jun. 23, 2016

(30) Foreign Application Priority Data

May 23, 2014 (KR) .................. 10-2014-0062190

(51) Int. Cl.
*G01S 13/88* (2006.01)
*G01S 13/72* (2006.01)
(Continued)

(52) U.S. Cl.
CPC ............ *G01S 13/883* (2013.01); *G01S 7/003* (2013.01); *G01S 13/726* (2013.01); *G01S 13/87* (2013.01); *G01S 2013/0272* (2013.01)

(58) Field of Classification Search
CPC ..................................................... G01S 13/883
(Continued)

(56) References Cited

U.S. PATENT DOCUMENTS 3,893,060 A * 7/1975 Balser ................. G01S 15/885
367/113
4,040,059 A * 8/1977 Simons ................. G08C 15/12
340/870.13
(Continued)

FOREIGN PATENT DOCUMENTS

KR 10-2004-0098789 A 11/2004
KR 10-2011-0060626 A 6/2011
KR 10-2013-0019561 A 2/2013

*Primary Examiner* — Peter Bythrow
*Assistant Examiner* — Helena Seraydaryan
(74) *Attorney, Agent, or Firm* — LRK Patent Law Firm

(57) ABSTRACT

The present inventive concept relates to an apparatus and method for multiplexing tracking information output from a plurality of tracking radar systems that are operated upon testing the flight of guided weapons, converting the multiplexed tracking information into a single PCM stream signal, and processing the tracking information together with telemetry data in an integrated manner, thus enabling the tracking information to be simply and economically utilized for test control and measurement tasks. The apparatus for converting multi-channel tracking information for integrated processing of flight data, includes a signal receiver for receiving pieces of tracking information from tracking radar systems through a plurality of input channels, a programmable semiconductor for multiplexing the pieces of tracking information, and converting the multiplexed tracking information into a data stream-type Pulse Code Modulation (PCM) frame, and a line driver for outputting the PCM frame to another piece of equipment.

12 Claims, 11 Drawing Sheets

(51) Int. Cl.
*G01S 7/00* (2006.01)
*G01S 13/87* (2006.01)
*G01S 13/02* (2006.01)

(58) Field of Classification Search
USPC .......................................................... 342/96
See application file for complete search history.

(56) References Cited

U.S. PATENT DOCUMENTS

| | | | |
|---|---|---|---|
| 5,654,698 A * | 8/1997 | Snelgrove | G08C 15/12 340/12.17 |
| 8,311,062 B2 * | 11/2012 | Torsner | H04W 28/065 370/466 |
| 2006/0178142 A1 * | 8/2006 | Lovberg | H04B 1/38 455/431 |
| 2008/0036659 A1 | 2/2008 | Smith et al. | |
| 2013/0315202 A1 * | 11/2013 | May | H04W 36/0005 370/331 |

* cited by examiner

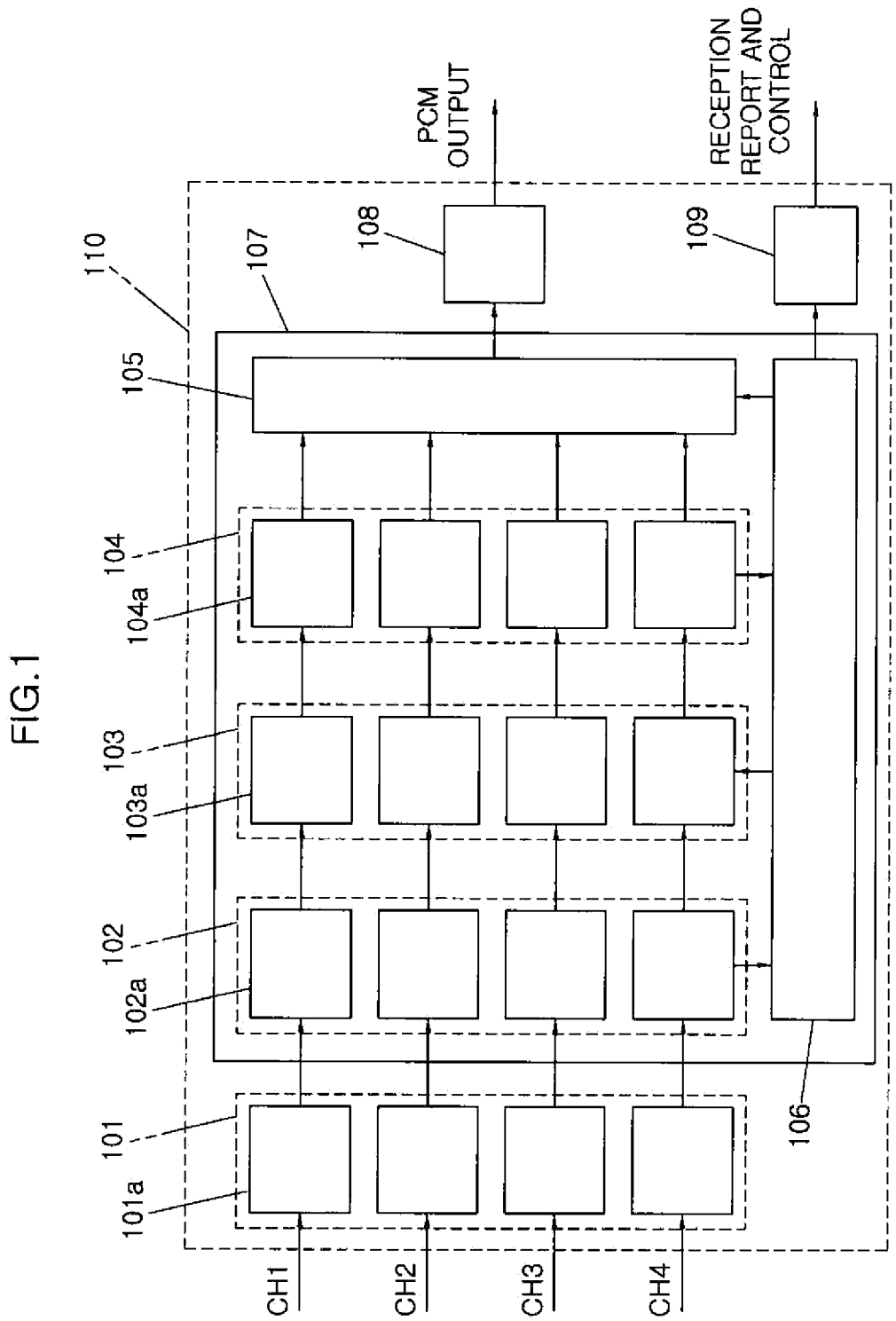

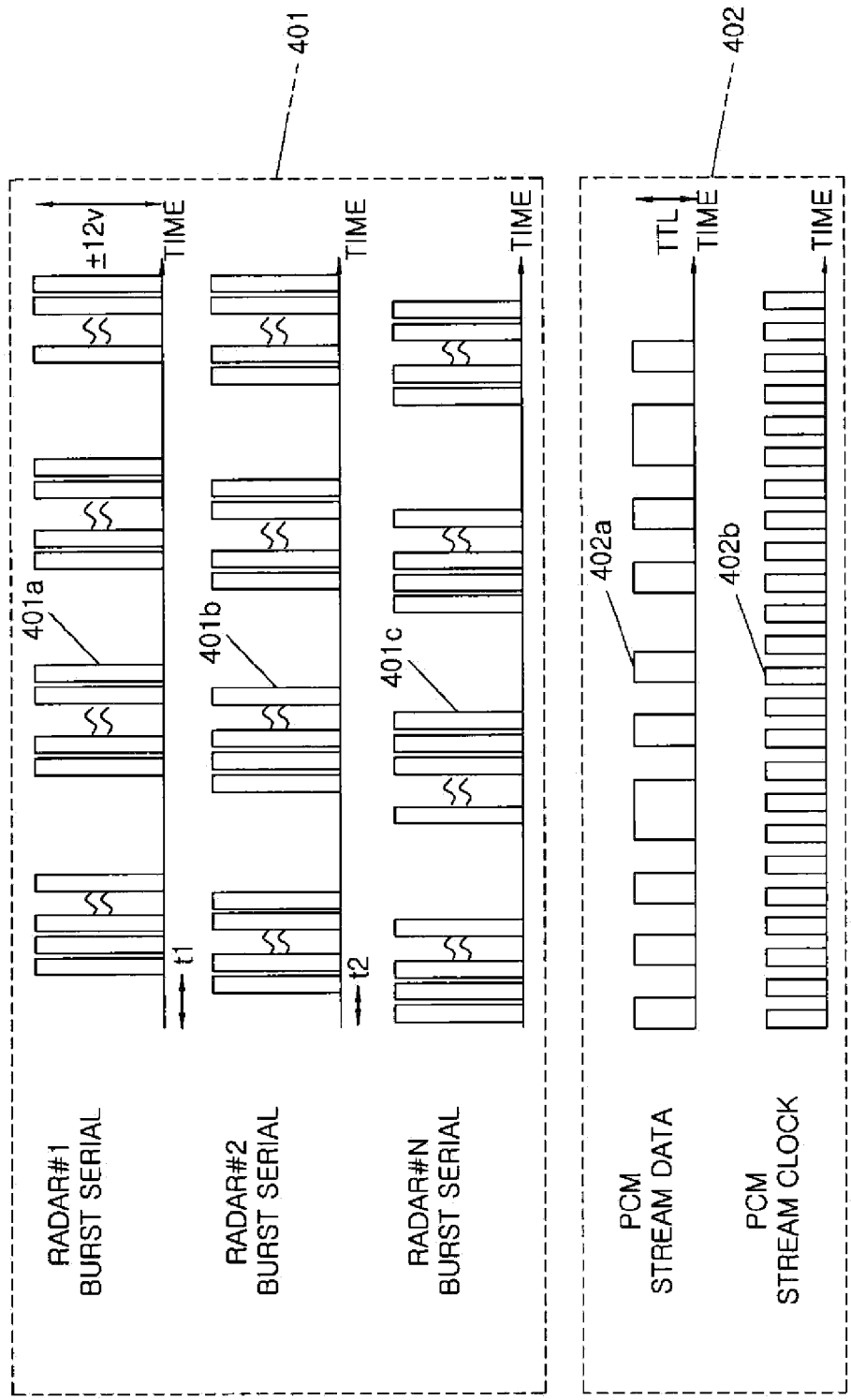

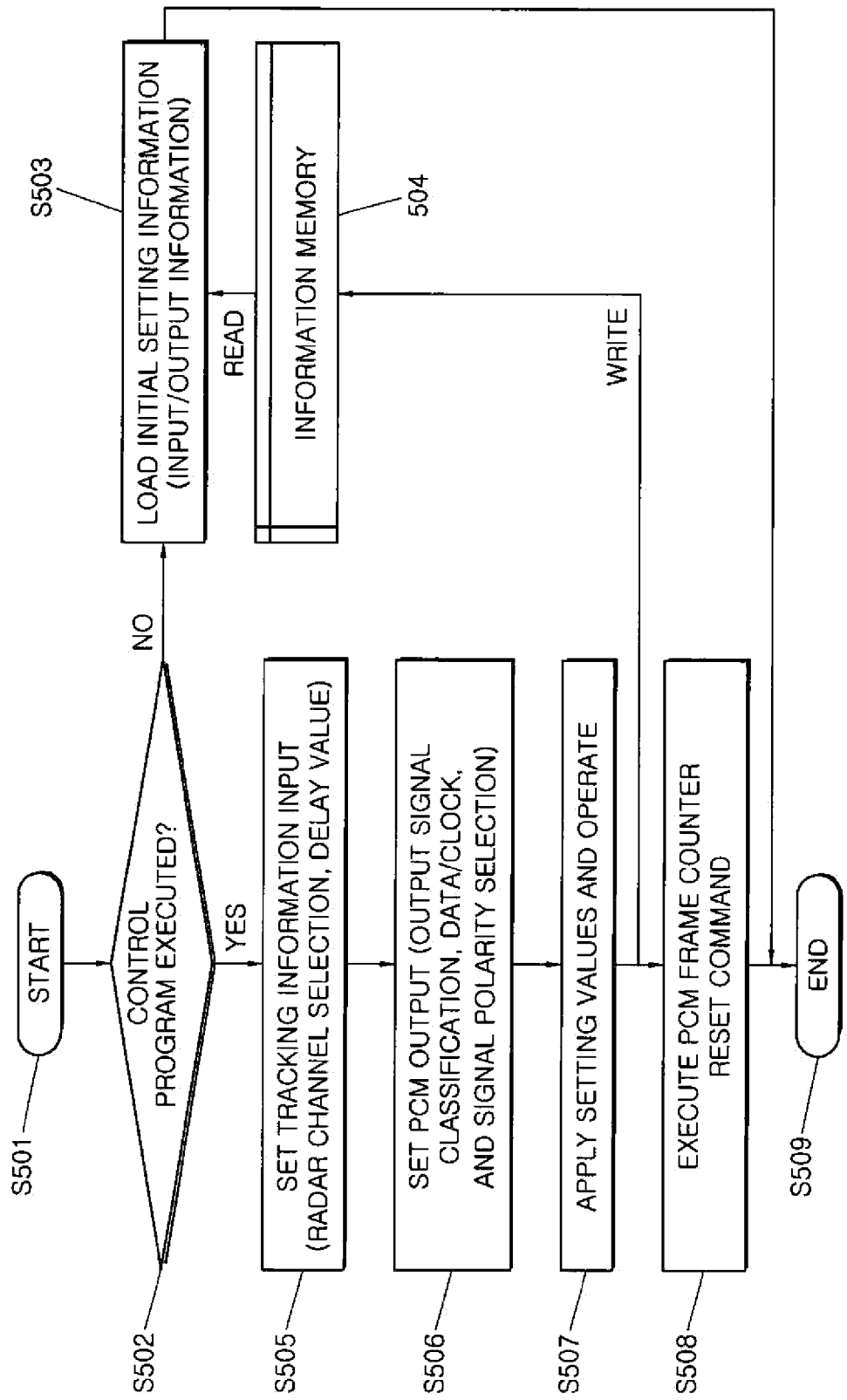

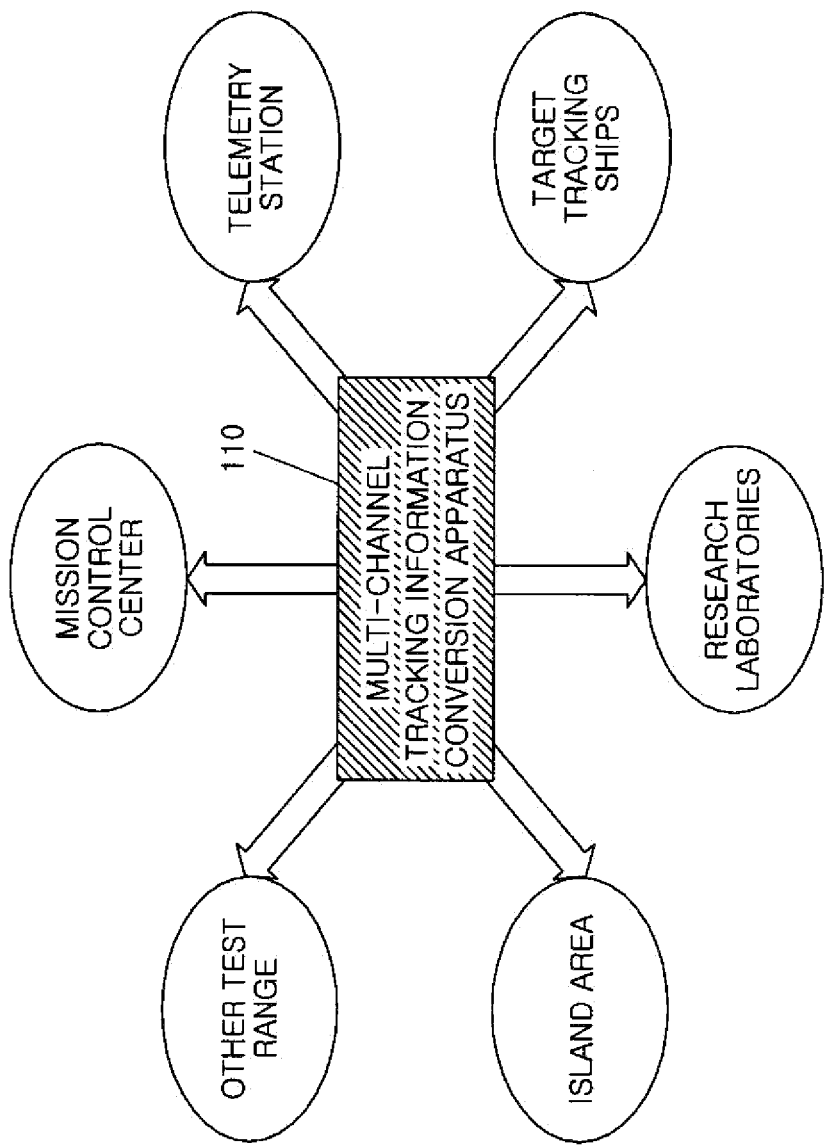

APPARATUS AND METHOD FOR CONVERTING MULTI-CHANNEL TRACKING INFORMATION FOR INTEGRATED PROCESSING OF FLIGHT DATA

CROSS REFERENCE TO RELATED APPLICATION

This application claims the benefit of Korean Patent Application No. 10-2014-0062190 filed May 23, 2014, the entire contents of which are incorporated herein by reference.

TECHNICAL FIELD

The present inventive concept relates generally to signal processing and, more particularly, to technology for performing multiplexing conversion and processing on guided weapon radar tracking information.

In particular, the present inventive concept relates to an apparatus and method for multiplexing tracking information output from a plurality of tracking radar systems that are operated upon testing the flight of guided weapons, converting the multiplexed tracking information into a single Pulse Code Modulation (PCM) stream signal, and processing the tracking information together with telemetry data in an integrated manner, thus enabling the tracking information to be simply and economically utilized for test control and measurement tasks.

BACKGROUND

In order to control and measure the flight tests of guided weapons in typical domestic/international national defense fields and the firing of space launch vehicles in civil fields, firing/safety control equipment and various types of measuring equipment are committed.

More specifically, tracking information (position, attitude, flight events, etc.) acquired from a tracking radar system and a telemetry system, among pieces of measuring equipment, is essential information for test control upon conducting a flight test.

The acquired tracking information is significant for control of safe and efficient tests, processing/fusion and visualization of test data, determination of real-time flight safety, actions against emergency termination, and generation of tracking equipment slave data. For this, integrated processing technology for flexible and various processing of radar and telemetry information is required.

Currently, the real-time control computer (Virtual Machine Environment (VME) bus structure and VxWorks operating system) of a mission control center receives tracking information from a plurality of tracking radar systems through RS232 signal standards, also receives guided weapon flight data from a telemetry receiving system through an Ethernet User Datagram Protocol (UDP), and performs real-time processing on the received data and visualization tasks for test data.

In order to control guided weapon flight tests and firing tasks of space launch vehicles, there are required tasks for processing/visualizing pieces of information acquired from a tracking radar system and a telemetry receiving system which correspond to core equipment. For this, a single independent system needs to process two pieces of acquired information in an integrated manner and, by means of integrated processing, principal test information required for test control can be generated.

First, according to typical technology, a real-time control computer system individually receives a plurality of pieces of radar tracking information through an RS232 standard, also receives some items needing real-time checking among pieces of telemetry data through a UDP, and performs real-time processing on the received information and items.

This scheme is problematic in that, due to system characteristics, a relatively high budget is required for development/the reinforcement of performance, telemetry information that can be processed is limited, a frequent variation in a visualization screen suitable for the characteristics of weapon systems is limited, and the movement to remote locations including island areas (including target tracking ships) is restricted upon conducting a long-range test.

Second, range safety technology (safety determination and analysis) for controlling guided weapon flight tests and space launch vehicle firing tasks is very significant for the protection of human/material resources, so that the development of technology is required, and for this, the development/inspection of algorithms is needed. However, a control computer in an existing mission control center is limited in modification/operation due to the frequent commitment to flight tests.

Third, a processing device operated in telemetry station processes only Pulse Code Modulation (PCM) signal-type telemetry signals, and is foreign-made equipment typically requiring high-cost service when separate functions are added. In other words, the processing device is characterized in that, with the development of continuous computing technology, the performance of processing devices has increased, and various visualization tools (Text, Graph, Strip/Time/Bar chart, X-Y plot, map, and 3D) are provided.

As described above, in order to overcome the described limitations, better utilize the performance of the existing processing device, and improve processing schemes, improvements such as relatively low development and maintenance costs, structural simplification for real-time properties/stability, the improvement of the ability to frequently change a visualization screen that meets weapon systems and user requirements and the ability to perform processing at remote locations, and the improvement of problems related to foreign equipment manufacturers such as high service costs, long development periods, and complex procedures in case of system-extension, have been presented.

For this, there is required the development of an independent (stand-alone) tracking information conversion apparatus, which is capable of simultaneously processing/recording a plurality of radar information and telemetry data by exploiting the existing processing devices (features: development of C-based flexible algorithm) and recording devices.

SUMMARY

Accordingly, the present inventive concept has been made keeping in mind the above problems occurring in the prior art, and an object of the present inventive concept is to provide an apparatus and method for converting multi-channel tracking information, which convert pieces of tracking information from a plurality of radar measuring systems into a Pulse Code Modulation (PCM) stream signal, thus allowing a previously provided telemetry processing device to process the tracking information in real-time at high speed.

Another object of the present inventive concept is to provide an apparatus and method for converting multi-channel tracking information, which allow tracking information from a radar system and a telemetry receiving system to be conveniently processed by a single system.

A further object of the present inventive concept is to provide an apparatus and method for converting multi-channel tracking information, which can configure a variable visualization screen for radar measurement information and telemetry information in conformity with the characteristics of a weapon system using a typical display tool within a processing device.

In accordance with an aspect of the present inventive concept to accomplish the above objects, there is provided an apparatus for converting multi-channel tracking information, which converts pieces of tracking information from a plurality of radar measuring systems into a Pulse Code Modulation (PCM) stream signal, thus allowing a previously provided telemetry processing device to process the tracking information in real-time at high speed.

The apparatus for converting multi-channel tracking information includes a signal receiver for receiving pieces of tracking information from tracking radar systems through a plurality of input channels; a programmable semiconductor for multiplexing the pieces of tracking information, and converting the multiplexed tracking information into a data stream-type Pulse Code Modulation (PCM) frame; and a line driver for outputting the PCM frame to another piece of equipment.

The programmable semiconductor may include a signal reception unit including a plurality of reception panels, each monitoring a reception status of received tracking information and generating status information; a delay control unit including a plurality of delay control panels, each correcting a temporal mismatch between the pieces of tracking information in response to the status information; a packet alignment unit for aligning the corrected tracking information on a radar Protocol Data Unit (PDU) basis; and a PCM frame generation unit for multiplexing the aligned tracking information in a form of a PCM frame.

The packet alignment unit may align the correlated tracking information with respect to a synchronization word of a radar PDU, declare a Lock status (in-sync) when synchronization words are detected from three or more consecutive radar PDUs, continuously monitor radar PDUs even in a Lock status, and determine an Unlock status (out-of-sync).

Each of the plurality of reception panels may include a serial-to-parallel conversion block for multiplexing received tracking information and converting multiplexed tracking information into byte data; and a channel status monitoring block for monitoring a status of an input port, determining whether reception has been activated, and then generating channel reception status information.

Each of the plurality of delay control panels may include a delay control block for generating a delay time; and a First-in First Out (FIFO) buffer for incorporating the generated delay time into the multiplexed tracking information, and thus correcting a temporal mismatch.

The PCM frame generation unit may include a stream control block for generating setting control information including channel identification (ID) and clock polarity in the tracking information; and a stream generation block for generating the PCM frame from the aligned tracking information by adding a frame synchronization word and a frame counter word to a radar PDU and status information in response to the setting control information.

The programmable semiconductor may further include a reception report control unit for setting operation variables for the signal reception unit, the delay control unit, the packet alignment unit, and the PCM frame generation unit, and reporting reception of the tracking information to an operator Personal Computer (PC).

The apparatus may further include a transceiver for performing communication between the reception report control unit and the operator PC, wherein the transceiver uses Recommended Standard (RS232) communication.

The plurality of reception panels and the signal receiver may use RS232 communication.

The PCM frame may be transmitted using a Most Significant Bit (MSB) and have a clock inversion function.

The PCM frame may have a size of 88 bytes (i.e. the size of the bytes is increased if a tracking radar is added), and include a frame synchronization word for frame synchronization, and a radar information word for indicating radar information and status, and a frame counter word for indicating a value sequentially increasing whenever a frame is generated.

In this case, the PCM frame may have a status word prefixed to the radar information word.

The status word may include a user-defined field, a new/old packet classification field for classifying new/old packets, a delay function field for indicating whether to use a delay function, a channel data classification field for indicating radar, a fixed pattern, and null, a synchronization status field for indicating whether synchronization has been acquired, a port status field for indicating whether a port input is present, and a radar port number field for indicating information about a port number of each radar system.

In this case, if the user-defined field is not defined, bit synchronization may be facilitated by inserting a fixed value of 0x5555 into a corresponding channel of the PCM frame and causing bit transition.

In accordance with another aspect of the present inventive concept to accomplish the above objects, there is provided a method of converting multi-channel tracking information for integrated processing of flight data, including receiving, by a signal receiver, pieces of tracking information from tracking radar systems through a plurality of input channels; multiplexing, by a programmable semiconductor, the pieces of tracking information; converting, by the programmable semiconductor, the multiplexed tracking information into a data stream-type Pulse Code Modulation (PCM) frame; and outputting, by a line driver, the converted PCM frame to another piece of equipment.

BRIEF DESCRIPTION OF THE DRAWINGS

The above and other objects, features and advantages of the present inventive concept will be more clearly understood from the following detailed description taken in conjunction with the accompanying drawings, in which:

FIG. 1 is a configuration diagram showing an apparatus for converting multi-channel tracking information for integrated processing of flight data according to an embodiment of the present inventive concept;

FIG. 4 is a waveform diagram showing an input signal waveform and an output signal waveform of the multi-channel tracking information conversion apparatus shown in FIG. 1;

FIG. 5 is an operation flowchart showing the multi-channel tracking information conversion apparatus for integrated processing of flight data according to an embodiment of the present inventive concept;

FIG. 8 is a diagram illustrating various operation platforms of the multi-channel tracking information conversion apparatus according to an embodiment of the present inventive concept.

DESCRIPTION OF THE PREFERRED EMBODIMENTS

Figure 2A:
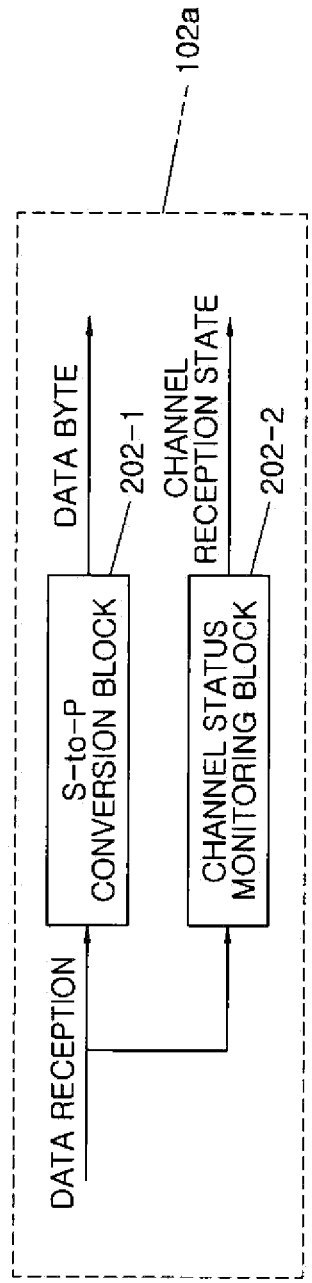
FIGS. 2A, 2B, and 2C are block diagrams showing detailed configuration of some components of the multi-channel tracking information conversion apparatus shown in FIG. 1.

The present inventive concept may be variously changed and may have various embodiments, and specific embodiments will be described in detail below with reference to the attached drawings. However, it should be understood that those embodiments are not intended to limit the present inventive concept to specific disclosure forms and they include all changes, equivalents or substitutions included in the spirit and scope of the present inventive concept.

The same reference numerals are used to designate the same or similar elements throughout the drawings.

In the present specification, the terms such as "first" and "second" may be used to describe various components, but these components should not be limited by the terms. The terms are merely used to distinguish a specific component from other components.

For example, a first component may be designated as a second component and a second component may also be designated as a first component in the similar manner, without departing from the scope of the present inventive concept. Further, terms such as "and/or" include a combination of a plurality of relevant described articles or any of the plurality of relevant described articles.

Unless differently defined, all terms used here including technical or scientific terms have the same meanings as the terms generally understood by those skilled in the art to which the present inventive concept pertains.

The terms identical to those defined in generally used dictionaries should be interpreted as having meanings identical to contextual meanings of the related art, and are not interpreted as being ideal or excessively formal meanings unless they are definitely defined in the present specification.

Hereinafter, an apparatus and method for converting multi-channel tracking information for integrated processing of flight data according to embodiments of the present inventive concept will be described in detail.

FIG. 1 is a configuration diagram showing an apparatus 110 for converting multi-channel tracking information for integrated processing of flight data according to an embodiment of the present inventive concept. The multi-channel tracking information conversion apparatus 110 is chiefly configured to include a programmable semiconductor (Field-Programmable Gate Array: FPGA) 107 functioning to process tracking information, a signal receiver 101, a transceiver 109, a line driver 108, etc.

Pieces of tracking information (e.g., time, azimuth angle, elevation angle, distance, signal strength, the flag of ON/OFF of tracking, etc.) from respective tracking radar systems are received through the input channels CH1 to CH4 of the multi-channel tracking information conversion apparatus 110. In this case, input channels are extensible according to a tracking radar system which a guided weapon test site has.

The signal receiver 101 receives the pieces of tracking information from respective radar systems (not shown), and converts the signal levels of the tracking information into Low Voltage Transistor-Transistor Logic (LVTTL) levels. The transceiver 109 exchanges a private program installed in a Personal Computer (PC) (not shown), and data and/or control signals. The line driver 108 strengthens electrical characteristics (fan-out) of transmission signals while providing a physical interface for PCM signals between other pieces of equipment connected to the tracking information conversion apparatus 110.

The signal receiver 101 is provided with respective receivers for communication channels CH1 to CH4, and the respective receivers may be Recommended Standard 232 (RS232) receivers.

The multi-channel tracking information conversion apparatus 110 includes therein the programmable semiconductor 107. The programmable semiconductor 107 is configured to include a signal reception unit 102, a delay control unit 103, a packet alignment unit 104, a PCM frame generation unit 105, and a reception report control unit 106.

The signal reception unit 102 aligns tracking information on a 8-bit (1-byte) basis so as to process an LVTTL level-asynchronous serial burst input signal with a baud rate of 19.2 Kbps, and monitors the status of reception to generate status data required to determine whether an input signal is present.

For this, the signal reception unit 102 is composed of a plurality of reception panels 102a, wherein each reception panel may be an RS232 reception panel.

The delay control unit 103 functions to correct a temporal mismatch that may occur due to the individual processing times and transmission delays of respective tracking radar systems, and functions to manually delay the data so as to perform comparison/correlation analysis in the same time band synchronized with other input channels.

The packet alignment unit 104 aligns input packets (that is, tracking information) on a radar Protocol Data Unit (PDU)-basis so as to perform PCM encoding on the input packets, and aligns the input packets so that 18 bytes are arranged with respect to each synchronization word (0x1616) of a radar PDU (at a period of 20 ms). When synchronization words are detected from three or more consecutive PDUs, a locked (in-sync) status is declared. Even in a Lock status, input PDUs are continuously monitored, and thus an Unlock status (out-of-sync) is determined.

The PCM frame generation unit 105 multiplexes pieces of tracking information, which are received from the respective radar systems (not shown) and are aligned, in the format of a PCM frame, and transmits the frame at regular periods of about 5 ms that is four times as fast as the transfer period of the radar PDU (20 ms).

A period of 5 ms is determined to process pieces of radar tracking information which are asynchronous with each other with respect to respective channels without missing the tracking information (according to the concept of high sampling). This is needed to be altered according to the transfer period of the radar PDU.

The reception report control unit 106 sets operation variables for the multi-channel tracking information conversion apparatus 110 through asynchronous Serial Communication Interface (SCI) communication, and transmits the pieces of tracking information received from the respective channels to a private program installed in an operator PC (not shown). A baud rate used for communication is about 115.2 Kbps.

Figure 2B:
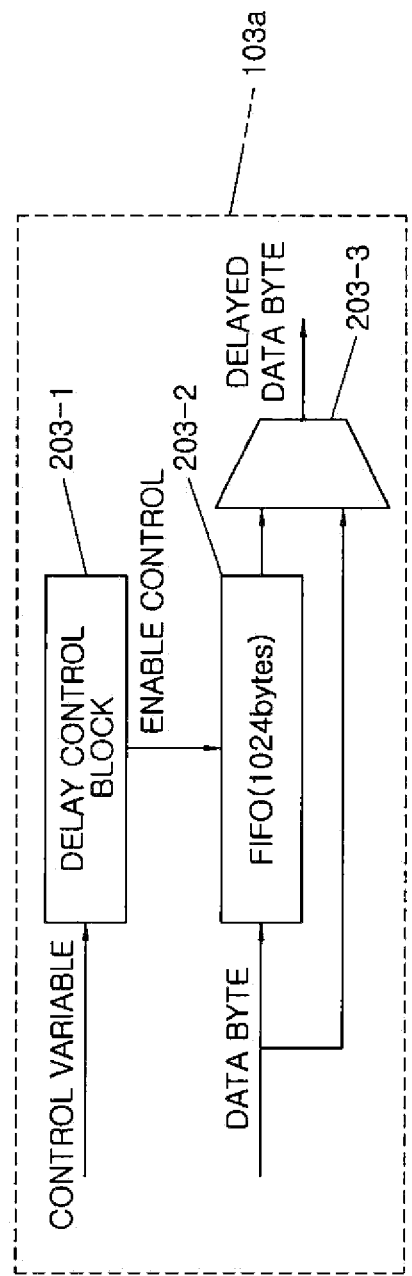
Figure 2C:
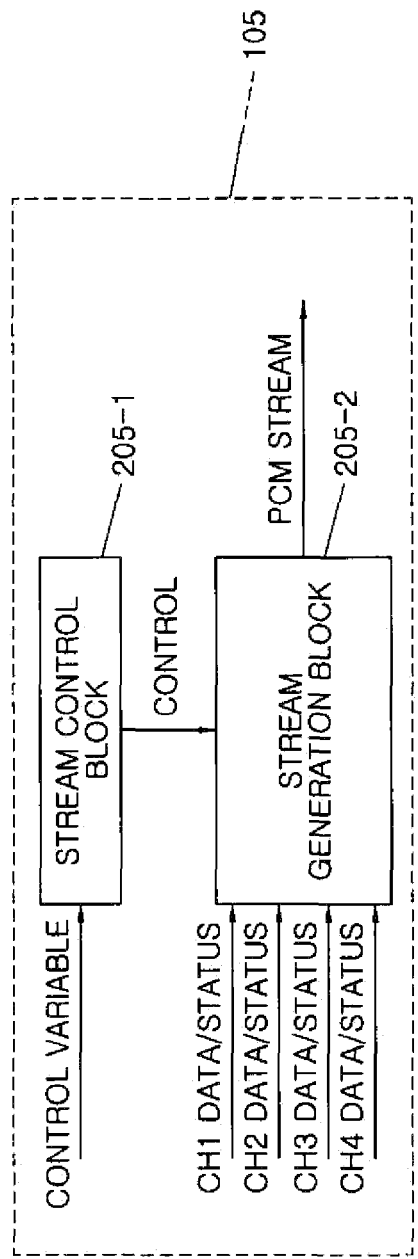

FIGS. 2A, 2B, and 2C are block diagrams showing detailed configuration of some components 102a, 103a, and 105 of the multi-channel tracking information conversion apparatus 110 shown in FIG. 1. Referring to FIG. 2A, a signal reception unit 102 (see FIG. 1) is composed of a plurality of reception panels 102a. One of the reception panels 102a includes a Serial-to-Parallel (S-to-P) conversion block 202-1 and a channel status monitoring block 202-2.

The S-to-P conversion block 202-1 functions to multiplex (that is, parallelize) pieces of tracking information (that is, tracking data) which are input to have a size of 18 bytes per about 20 ms, and transmit byte data to the delay control unit 103.

The channel status monitoring block 202-2 monitors the status of an input port, determines whether reception has been activated, and then generates a flag. If data having a length of about 60 bytes or longer, corresponding to a threshold, is received for a time of about 100 ms, it is determined that the reception status of the current channel is good.

Referring to FIG. 2B, the delay control unit 103 (see FIG. 1) is composed of a plurality of delay control panels 103a. One of the delay control panels 103a includes a delay control block 203-1, a First In First Out (FIFO) buffer 203-2, and a multiplexer (MUX) 203-3.

The delay control block 203-1 controls the FIFO buffer 203-2 so that data is delayed by a delay value (that is, a delay time) set by the operator.

The delay value can be used to control the delay by a maximum of about 1 second in increments of about 1 ms, and data is delayed by controlling the enable operation of the FIFO buffer 203-2 to a degree corresponding to a control variable.

When a delay function is deactivated, the FIFO buffer 203-2 is bypassed by the MUX 203-3. For the storage space of the FIFO buffer 203-2, since about 18-byte information is updated at a rate of about 50 Hz, about 900 bytes are required for storage for a maximum of about 1 second, and about 1024 bytes may be sufficient even if a time difference between systems is taken into consideration.

If data is processed by synchronizing times as in the case of the embodiment of the present inventive concept, it may be profitable for the analysis of flight events and/or the fusion of data. That is, when a manual delay function is not used, the delay time of each channel based on the processing of the multi-channel tracking information conversion apparatus 110 is estimated to be about 25 ms or less. This relation is represented by the following equation:

20 ms(50 Hz radar PDU period)+5 ms(PCM frame delay)=25 ms

Referring to FIG. 2C, the PCM frame generation unit 105 is configured to include a stream control block 205-1 and a stream generation block 205-2.

The stream control block 205-1 incorporates setting control information, such as channel identification (ID) and data/clock polarities set by the operator, into stream-format tracking information.

The stream generation block 205-2 adds frame synchronization words and frame counter words to radar PDUs and status information, received from respective channels, and then generates a PCM frame having a total of about 88 bytes (44 channels×2 bytes). In the event that the tracking radar systems are increased, the number of the total bytes is represented by the following equation:

the number of total bytes=[(10 channels*$N$)+4 channels]2 bytes

Here, N is the number of tracking radars.

The total data rate of the PCM frame has a bit rate of 44 channels×16 bits×200 Hz=140.8 Kbps. The transmission of the PCM frame is performed to enable a Most Significant Bit (MSB) to be transmitted first, and has a clock inversion function for smooth interfacing with other pieces of equipment.

Figure 3A:
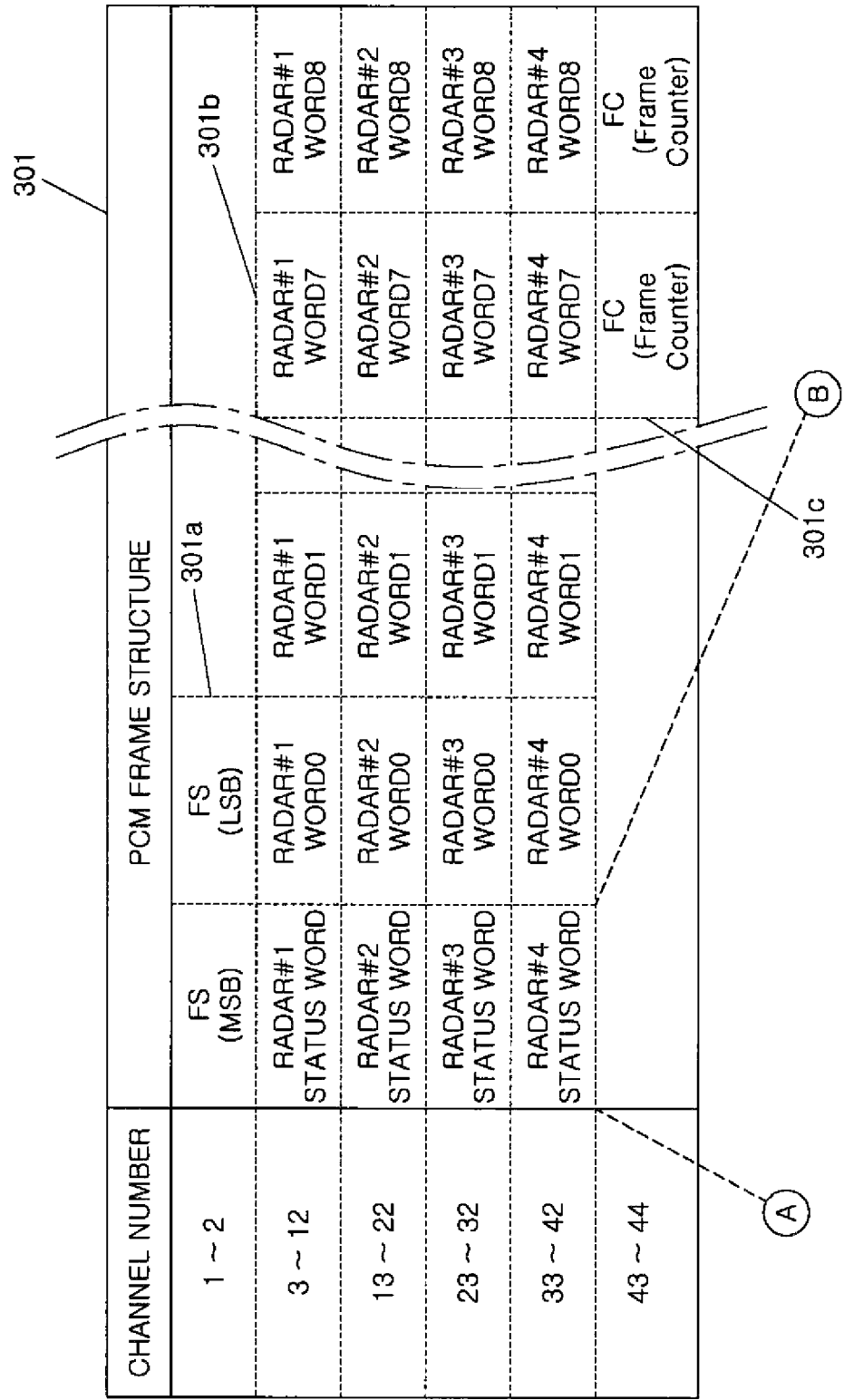
FIGS. 3A and 3B are diagrams showing the structure of a Pulse Code Modulation (PCM) frame generated by converting radar tracking information into a stream according to an embodiment of the present inventive concept.
Figure 3B:
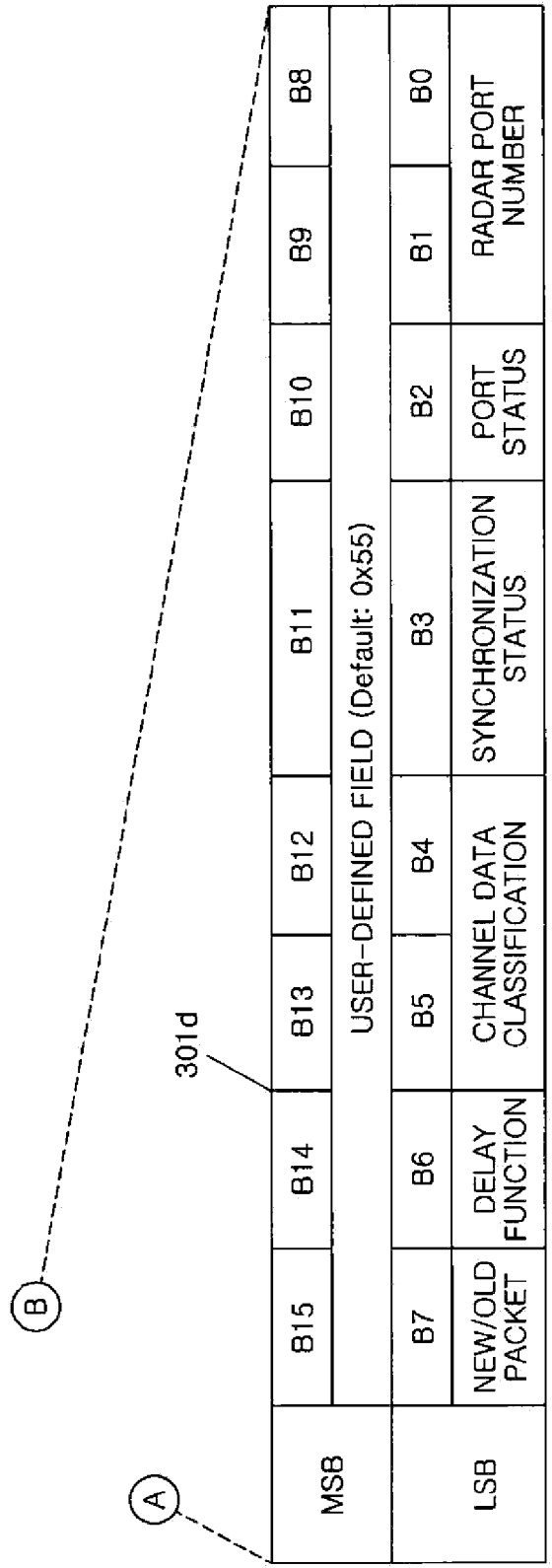

FIGS. 3A and 3B are diagrams showing the structure of a Pulse Code Modulation (PCM) frame generated by converting radar tracking information into a stream according to an embodiment of the present inventive concept. Referring to FIG. 3A, the structure of a PCM frame 301 may be divided into a frame synchronization (sync) word 301a for frame synchronization, a radar information word 301b indicating radar information and status, and a frame counter word 301c indicating a value sequentially increasing whenever a frame is generated. In order to process such words, the construction of a preliminary database is required by a telemetry tracking information processing device (not shown).

Since the PCM frame 301 has a size of 16 bits per channel, 44 channels per frame, and a frame period of about 200 Hz, the output bit rate of the PCM frame is about 44×16×200=140.8 Kbps.

The telemetry tracking information processing device (not shown) identifies (Lock/Unlock status) a frame synchronization word from an input stream signal to distinguish channels of the overall frame, and classifies respective pieces of radar information based on a previously allocated word size.

Each piece of radar information has a size of 2 bytes×9 words=18 bytes. The frame counter word 301c is a value sequentially increasing whenever one frame is generated, is usefully used when the frame is processed, and has a sufficient size due to the allocation of two channels ($2^{32}$=4294967296).

Referring to FIG. 3B, a status word 301d is prefixed to each radar information word 301b, and includes a user-defined field, a new/old packet classification field for classifying new and old packets, a delay function field for indicating whether a delay function has been used, a channel data classification field (for example, radar, a fixed pattern, null, etc.), a synchronization status field for indicating whether synchronization has been acquired, a port status field for indicating whether a port input is present, and a radar port number field for indicating information about the port number of each radar system.

The status word 301d enables the current operation status of the multi-channel tracking information conversion apparatus 110 (see FIG. 1) to be detected in addition to pure radar information when the telemetry processing device processes the tracking information. In particular, the user-defined field may be randomly defined and used depending on the purpose of the user, and if it is not defined, a fixed pattern, that is, 0x55 (binary: 01010101), is allocated to the user-defined field to facilitate bit synchronization.

FIG. 4 is a waveform diagram showing an input signal waveform 401 and an output signal waveform 402 of the multi-channel tracking information conversion apparatus 110 shown in FIG. 1. Referring to FIG. 4, the input signal waveform 401 shows that an RS232 serial signal having a magnitude of ±12 volts from radar is input in bursts at a baud rate of 19.2 Kbps, and has a transfer period of 50 Hz.

Pieces of radar information, which are processed for respective sites and are asynchronous discontinuous signals having different processing times and propagation delay characteristics, have different drifts for respective channels (401a to 401c). When a delay control function is used, the time axes of respective channels are aligned to enable correlation/error analysis to be performed in the same time band.

The output signal waveform 402 is a PCM stream signal having a TTL level, and has a transfer period of about 5 ms at a bit rate of about 140.8 Kbps. A data signal 402a indicates that respective pieces of input radar information are contained and Non Return to Zero-Level (NRZ-L) codes are output in the form of a continuous stream, and a clock signal 402b is used to be provided to other pieces of equipment (recording device or other processors) connected to the multi-channel tracking information conversion apparatus 110 (see FIG. 1).

FIG. 5 is an operation flowchart showing the multi-channel tracking information conversion apparatus for integrated processing of flight data according to an embodiment of the present inventive concept. Referring to FIG. 5, when power is supplied to the multi-channel tracking information conversion apparatus 110 (see FIG. 1), it is determined whether to execute a control program at steps S501 and S502.

If it is determined not to use the control program, initial setting information stored in internal memory 504 is loaded, the operation of the multi-channel tracking information conversion apparatus 110 is performed, and the supply of power is stopped to terminate the process at steps S503 and S509.

If it is determined to use the control program, settings are changeable through a Graphical User Interface (GUI) in such a way that, in input fields, a function of selecting a radar channel to be used in the input fields and/or a function of setting a delay value (default: "0") if necessary are set, and that in output fields, functions such as the selection of a signal desired to be output (default: radar, test pattern, and null), PCM data/clock selection (default: data), and polarity inversion (default: normal), are set, at steps S505 and S506.

If setting has been completed, an operation is performed while an application command is sent to information memory 504 to store the setting information in the information memory 504 at step S507. A frame counter reset command may be executed if necessary at steps S508 and S509.

Figure 6:
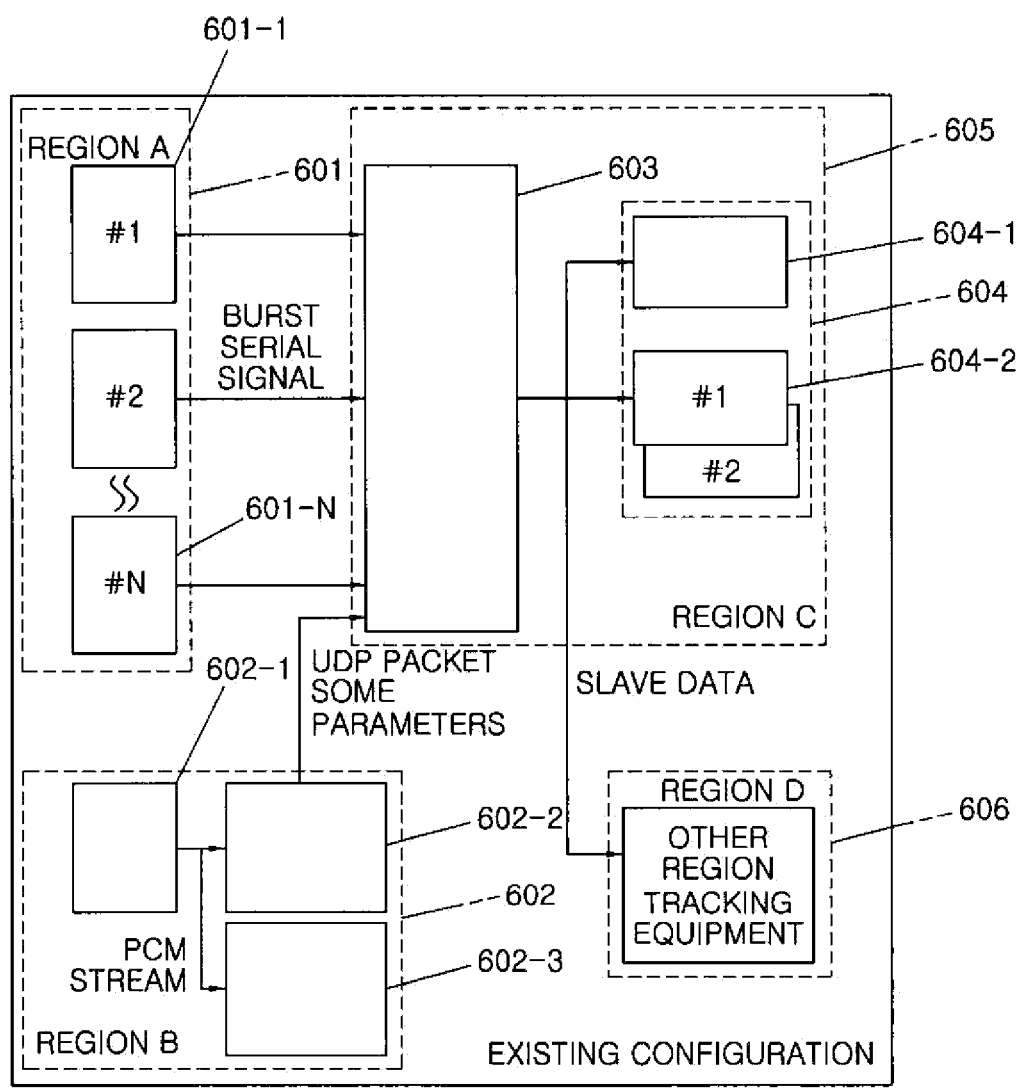
FIG. 6 is a diagram showing the configuration of a typical system.
Figure 7:
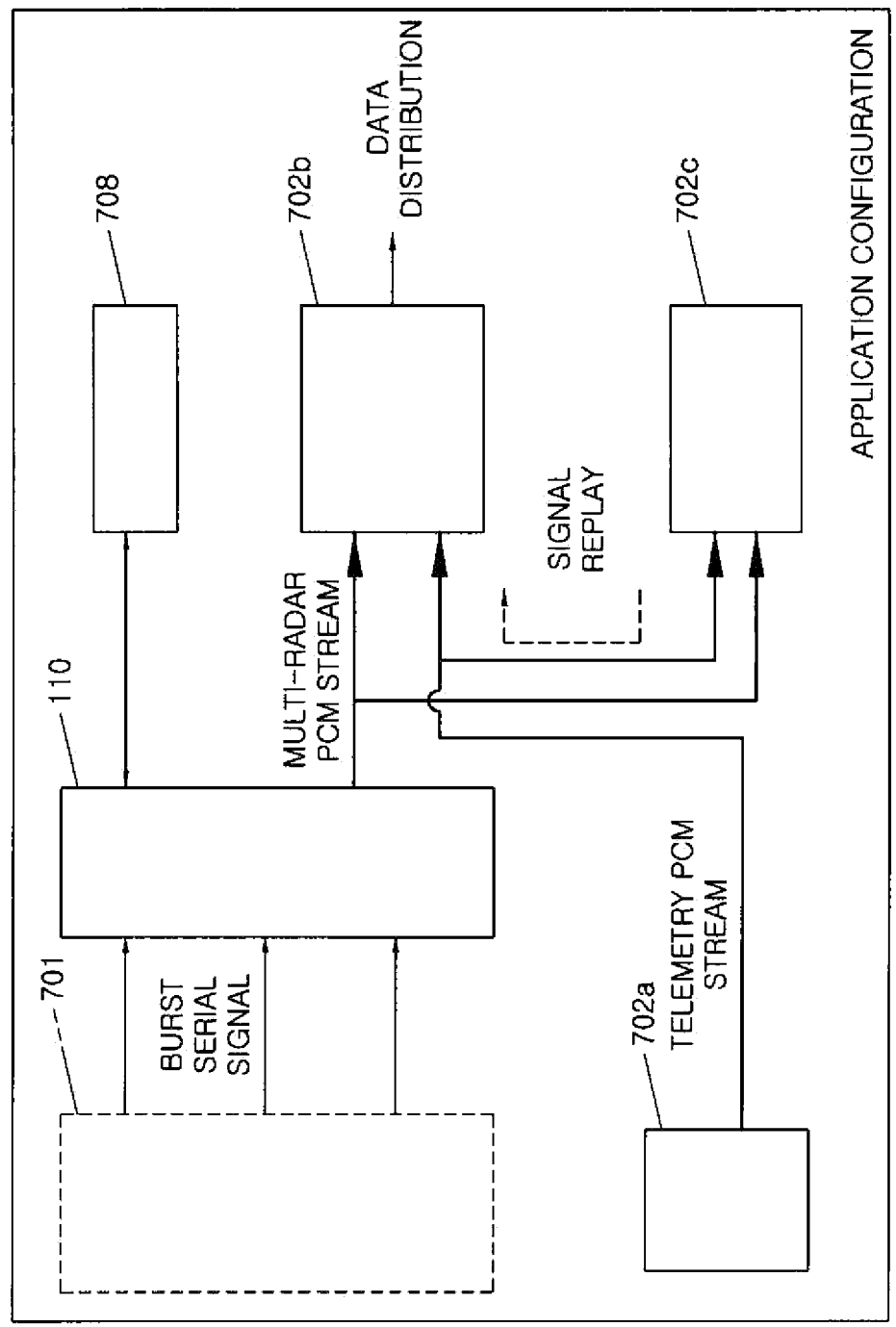
FIG. 7 is a diagram showing the configuration of a system to which the multi-channel tracking information conversion apparatus according to an embodiment of the present inventive concept is applied.

FIG. 6 is a diagram showing the configuration of a typical system. FIG. 7 is a diagram showing the configuration of a system to which the multi-channel tracking information conversion apparatus according to an embodiment of the present inventive concept is applied. Referring to FIG. 6, a real-time control computer system 603 receives burst RS232 serial signals from a tracking radar system 601 composed of first to N-th tracking radar systems 601-1 to 601-N, receives and processes some items of information processed by a telemetry station 602 through a UDP, and displays the processed information on various visualization systems 604 of a mission control center 605. Some items of the processed information undergo coordinate conversion, and resulting data is provided as slave data to tracking equipment 606 located in another region.

Of course, for such a configuration, the telemetry station 602 includes a telemetry receiving system 602-1, a telemetry processing device 602-2, and a telemetry recording device 602-3.

Further, the visualization system 604 includes a safety determination visualization unit 604-1 and a fight data visualization unit 604-2.

Such a typical configuration has operational difficulties such as the requirement of relatively high budget in the development/reinforcement of performance, the limitation of telemetry information that can be processed, the limitation of frequent variation in visualization screens suitable for the characteristics of different weapon systems, and the limitation of movement to a remote location including island areas, and technical restrictions in existing processing devices for research in range safety techniques.

FIG. 7 is a diagram showing a system to which the multi-channel tracking information conversion apparatus 110 according to an embodiment of the present inventive concept is applied. Radar PCM streams output from the multi-channel tracking information conversion apparatus 110 and PCM stream signals output from a telemetry receiving system 702a may be processed and recorded using a telemetry processing device 702b and a telemetry recording device 702c which are in operation.

The information may be processed and may be transmitted to display tools (about 13 types at present but are expected to be increased continuously in future) in the processing device or to an external visualization system 604 (see FIG. 6) and/or tracking equipment in another region 606 (see FIG. 6) if necessary. The setting values of the multi-channel tracking information conversion apparatus 110 may be used to change operation variables through a control PC 708.

Application examples of the multi-channel tracking information conversion apparatus 110 according to an embodiment of the present inventive concept are described below.

1. Basic tasks (real-time visualization for control) are performed while the real-time control computer system 603 (see FIG. 6) of a typical mission control center is operated without change, and a telemetry processing device 702b separately configures and uses various flight information visualization screens (including the determination of flight safety) suitable for the characteristics of respective weapon systems and user requirements.

In particular, since the real-time control computer system 603 frequently executes the unique tasks of test sites, research into flexible range safety techniques may be conducted through the multi-channel tracking information conversion apparatus 110 according to an embodiment of the present inventive concept, independent of the unique tasks of the test sites.

2. The standardization of an input interface conforming to the Ethernet may be investigated when the real-time control computer system 603 is replaced and/or is reinforced. In this case, radar information and telemetry information are transmitted via the Ethernet UDP.

3. When a long-range flight test is conducted, the operation of a tracking radar system and telemetry receiving systems 602 and 702a from a remote location may be expected, and thus the multi-channel tracking information conversion apparatus 110 may be used to analyze and visualize two types of tracking information and to generate slave data in the remote location.

FIG. 8 illustrates various operation platforms of the multi-channel tracking information conversion apparatus 110 according to an embodiment of the present inventive concept. Referring to FIG. 8, the multi-channel tracking information conversion apparatus 110 is easily movable owing to the light-weight and small-size structure thereof, thus enabling the apparatus to be conveniently operated in mission control centers, telemetry station, remote locations (island areas and target tracking ships), research laboratories, and other test sites, and also enabling the apparatus to be designed in a portable form.

When the multi-channel tracking information conversion apparatus according to the embodiment of the present inventive concept is applied, a typical telemetry processing device or a commercial processing device which is in operation can conveniently and economically process the tracking information of radar measuring systems, and can generate parameters required for test control by processing the tracking information in various forms.

More specifically, a typical telemetry processing device may perform a series of tasks such as channel allocation, parameter extraction/engineering unit conversion, parameter display/reprocessing, storage and post-processing on radar tracking information in the same manner as telemetry information.

Further, both radar tracking information and telemetry tracking information can be processed, so that two types of tracking information can be comparatively analyzed/fused, and slave data which is can help the unstable tracking status when tracking equipment is self-tracking (radar, telemetry or optical tracking) to be supplemented can be generated by applying weights or a priority algorithm to the two types of information.

The multi-channel tracking information conversion apparatus receives four pieces of radar tracking information, multiplexes the received information to generate a PCM frame, and outputs a Non Return to Zero-Level (NRZ-L) code having a TTL level.

By means of the multi-channel tracking information conversion apparatus according to the embodiment of the present inventive concept, radar tracking information and telemetry tracking information can be processed/recorded/visualized using commercial equipment, and can be easily extended when a radar system is introduced. The hardware is a rack mount type device having a size of 1 U, and the inside thereof may be compactly configured using a Field Programmable Gate Array (FPGA), an RS232 receiver, a transceiver, a line driver, etc.

In accordance with the present inventive concept, an advantage of the present inventive concept is that the processing ability of a typical PCM signal processor can be extended, the utility and comparative analysis ability of radar/telemetry tracking information can be improved, and a variable visualization screen (including range safety) for test control can be simply and very economically configured.

Further, another advantage of the present inventive concept is that tracking information of a radar system and a telemetry receiving system, which are regarded as core equipment in the guided weapon test site, can be processed by a single previously provided system, and thus slave data that can be provided to tracking equipment can be generated using various mathematical filtering techniques.

Further, a further advantage of the present inventive concept is that tracking information measured by a test site radar measurement system can be processed by a telemetry processing device, thus extending of usage fields of tracking information, enabling the comparative analysis of various types of real-time data, and economically overcoming factors such as high cost services provided by foreign-made equipment manufacturers, and/or a long development period and/or the limitation of data processing ability.

Furthermore, yet another advantage of the present inventive concept is that, if a system for sharing and transmitting/receiving tracking information is constructed between two test sites, the tracking ability of each piece of test site tracking equipment can be supplemented and the comparative analysis of radar/telemetry tracking data can be performed without requiring separate new equipment, and that collaborative tracking between a radar system and a telemetry receiving system is made possible by generating the slave data in a situation in which it is difficult to construct a wireless communication network with other regions (island areas or target tracking ships).

Furthermore, still another advantage of the present inventive concept is that the present inventive concept can be utilized for test evaluation such as the development/performance test of flight vehicles, such as guided weapons/rockets/airplanes/target drones, in military and aerial fields in the future, and can be simply developed into a tracking information integrated processing device, thus providing military and economical effects.

Furthermore, still another advantage of the present inventive concept is that the present inventive concept can be highly useful in consideration of the fact that a tracking radar system and a telemetry receiving system can be simultaneously operated for flight vehicle tracking/flight information acquisition/safety control in domestic/international guided weapon test sites.

Although the preferred embodiments of the present inventive concept have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for converting multi-channel tracking information for integrated processing of flight data, the apparatus comprising:
    a signal receiver for receiving pieces of tracking information from tracking radar systems through a plurality of input, channels;
    a programmable semiconductor for multiplexing the pieces of tracking information, and converting the multiplexed tracking information into a data stream-type Pulse Code Modulation (PCM) frame; and
    a line driver for outputting the PCM frame to another piece of equipment,
    wherein the programmable semiconductor comprises:
    a signal reception unit including a plurality of reception panels, each monitoring a reception status of received tracking information and generating status information required to determine whether an input signal is present;
    a delay control unit including a plurality of delay control panels, each correcting a temporal mismatch between the pieces of tracking information in response to the status information due to individual processing times and transmission delays of the tracking radar systems;
    a packet alignment unit for aligning the corrected tracking information on a radar Protocol Data Unit (PDU) basis; and
    a PCM frame generation unit for multiplexing the aligned tracking information in a form of a PCM frame, and
    wherein the apparatus is of a stand-alone type.

2. The apparatus of claim 1, wherein the packet alignment unit aligns the correlated tracking information with respect to a synchronization word of a radar PDU, declares a locked (in-sync) status when synchronization words are detected from three or more consecutive radar PDUs, continuously monitors radar PDUs even in a Lock status, and determines an Unlock status (out-of-sync).

3. The apparatus of claim 1, wherein each of the plurality of reception panels comprises:
- a serial-to-parallel conversion block for multiplexing received tracking information and converting multiplexed tracking information into byte data; and
- a channel status monitoring block for monitoring a status of an input port, determining whether reception has been activated, and then generating channel reception status information.

4. The apparatus of claim 1, wherein each of the plurality of delay control panels comprises;
- a delay control block for generating a delay time; and
- a First-in First Out (FIFO) buffer for incorporating the generated delay time into the multiplexed tracking information, and thus correcting a temporal mismatch.

5. The apparatus of claim 1, wherein the PCM frame generation unit comprises:
- a stream control block for generating setting control information including channel identification (ID) and clock polarity in the tracking information; and
- a stream generation block for generating the PCM frame from the aligned tracking information by adding a frame synchronization word and, a frame counter word to a radar PDU and status information in response to the setting control information.

6. The apparatus of claim 1, wherein the programmable semiconductor further comprises a reception report control unit for setting operation variables for the signal reception unit, the delay control unit, the packet alignment unit, and the PCM frame generation unit, and reporting reception of the tracking information to an operator Personal Computer (PC).

7. The apparatus of claim 6, further comprising a transceiver for performing communication between the reception report control unit and the operator PC, wherein the transceiver uses Recommended Standard (RS232) communication.

8. The apparatus of claim 1, wherein the plurality of reception panels and the signal receiver use RS232 communication.

9. The apparatus of claim 1, wherein the PCM frame is transmitted using a Most Significant Bit (MSB) and has a clock inversion function.

10. The apparatus of claim 1, wherein the PCM frame has a size of 88 bytes, includes a frame synchronization word for frame synchronization, and a radar information word for indicating radar information and status, and a frame counter word for indicating a value sequentially increasing whenever a frame is generated, and has a status word prefixed to the radar information word.

11. The apparatus of claim 10, wherein the status word includes a user-defined field, a new/old packet classification field for classifying new and old packets, a delay function field for indicating whether to use a delay function, a channel data classification field for indicating radar, a fixed pattern, and null, a synchronization status field for indicating whether synchronization has been acquired, a port status field for indicating whether a port input is present, and a radar port number field for indicating, information about a port number of each radar system, wherein if the user-defined field is not defined, bit synchronization is facilitated by inserting a fixed value of 0x5555 into a corresponding channel of the PCM frame and causing bit transition.

12. A method of converting multi-channel tracking information for integrated processing of flight data, the method comprising:
- receiving, by a signal receiver, pieces of tracking information from tracking radar systems through a plurality of input channels;
- multiplexing, by a programmable semiconductor, the pieces of tracking information;
- converting, by the programmable semiconductor, the multiplexed tracking information into a data stream-type Pulse Code Modulation (PCM) frame; and
- outputting, by a line driver, the converted PCM frame to another piece of equipment,
- wherein the multiplexing comprises monitoring, by a signal reception unit, a reception status of received tracking information and generating status information required to determine whether an input signal is present, and
- wherein the converting comprises:
- correcting, by a delay control unit, a temporal mismatch between the pieces of tracking information in response to the status information due to individual processing times and transmission delays of the tracking radar systems;
- aligning, by a packet alignment unit, the corrected tracking information on a radar Protocol Data Unit (PDU) basis; and
- multiplexing, by a PCM frame generation unit, the aligned tracking information in a form of a PCM frame.

* * * * *